(12) United States Patent
Behzadi

(10) Patent No.: US 9,600,089 B2
(45) Date of Patent: Mar. 21, 2017

(54) OPTICAL DIGITAL RULER

(71) Applicant: ADOBE SYSTEMS INCORPORATED, San Jose, CA (US)

(72) Inventor: Arian Behzadi, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 252 days.

(21) Appl. No.: 14/506,313

(22) Filed: Oct. 3, 2014

(65) Prior Publication Data

US 2016/0098103 A1   Apr. 7, 2016

(51) Int. Cl.
*G06F 3/03* (2006.01)
*G06F 3/039* (2013.01)
*G06F 3/0488* (2013.01)
*G06F 3/0354* (2013.01)

(52) U.S. Cl.
CPC ............ *G06F 3/0317* (2013.01); *G06F 3/039* (2013.01); *G06F 3/03544* (2013.01); *G06F 3/04883* (2013.01)

(58) Field of Classification Search
None
See application file for complete search history.

(56) References Cited

U.S. PATENT DOCUMENTS

| 8,896,621 | B1 | 11/2014 | Sipher et al. |
| 2008/0159088 | A1 | 7/2008 | Simmons et al. |
| 2011/0175821 | A1 | 7/2011 | King |
| 2013/0321350 | A1 | 12/2013 | Mesaros et al. |
| 2014/0108976 | A1 | 4/2014 | Steiner et al. |

FOREIGN PATENT DOCUMENTS

EP   2442210 A2   4/2012

OTHER PUBLICATIONS

Search Report dated Feb. 4, 2016 with Examination Report dated Feb. 5, 2016 in Application No. GB1512994.3, 5 pages.

*Primary Examiner* — Nicholas Lee
(74) *Attorney, Agent, or Firm* — Shook, Hardy & Bacon L.L.P

(57) ABSTRACT

Embodiments of the present invention provide systems, methods, and computer storage media directed to an optical digital ruler. The optical digital ruler includes at least two optical sensors allowing physical movement and rotation of the optical digital ruler to facilitate positioning a template on a canvas or background. As such, a particular drawing stroke on the canvas or background can be drawn in alignment with a template irrespective of whether a path input by a user via a stylus aligns with the template. In some implementations, a drawing stroke is aligned with a template edge when the optical digital ruler has been activated despite the location of the path.

20 Claims, 11 Drawing Sheets

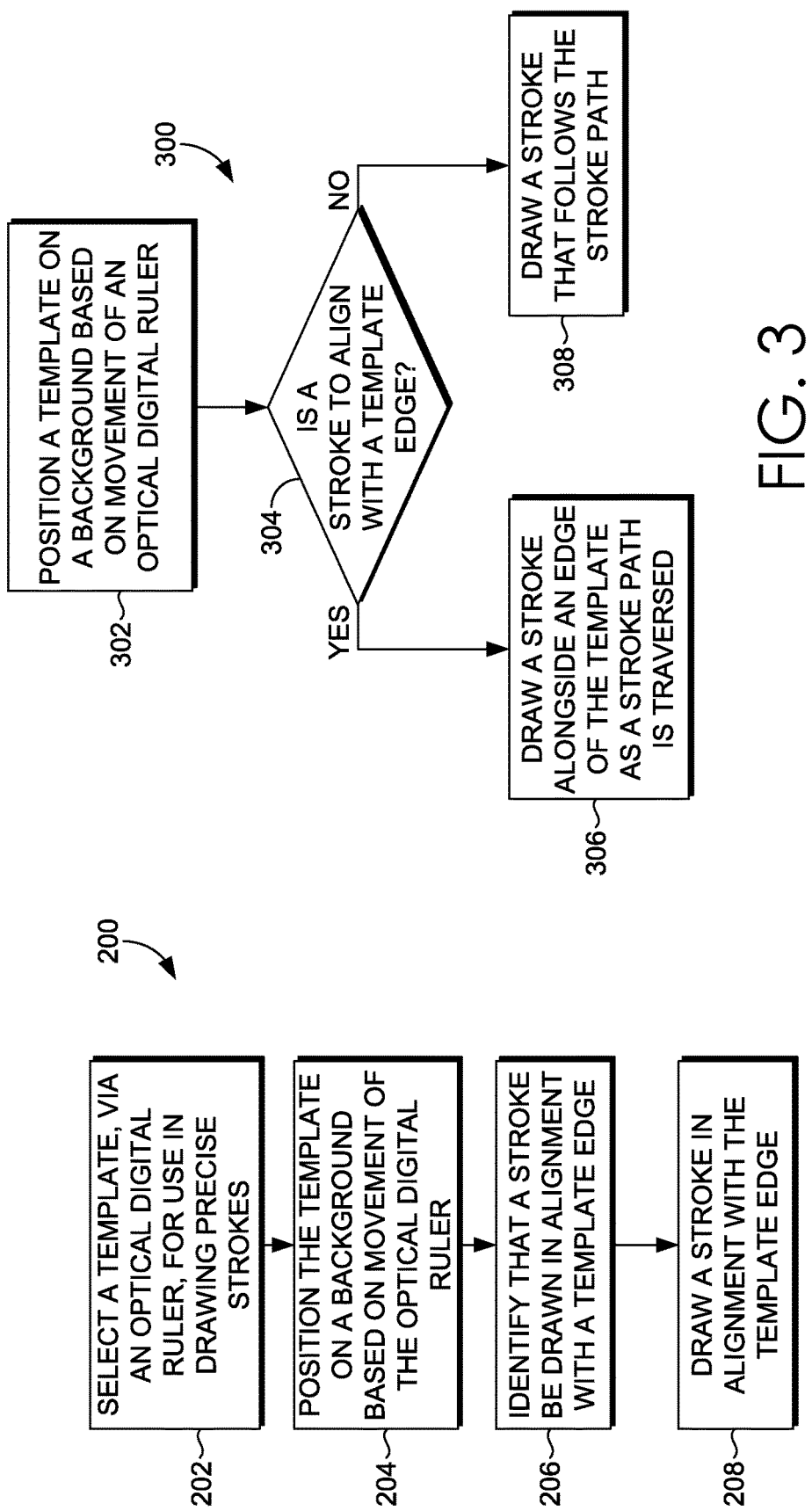

OPTICAL DIGITAL RULER

BACKGROUND

Some drawing services, such as the ADOBE LINE and ADOBE SKETCH, have been developed that provide mechanisms for users to generate drawings or sketches in an electronic format. Many electronic drawing services enable a user to generate drawing strokes in a free-form manner. For example, a user can move a finger or stylus over a canvas or background via a drawing application running on a touchscreen device to draw a line, curve, polygon, or any object. Similarly, if a touchscreen device is not available, the user can interact with a non-touchscreen stylus and the interactions can be translated by the drawing application or device to draw a line, curve, polygon, or any object. Drawing a straight line or a shape in a precise or symmetrical manner, however, can be difficult.

SUMMARY

Embodiments of the present invention relate to an optical digital ruler that enables drawing lines or strokes in a precise manner. In this way, a user can utilize the optical digital ruler to facilitate drawing straight lines or other predefined shapes on a canvas. Generally, an optical digital rule is a device that includes at least two optical sensors to control placement of an electronic template used to draw precise strokes. The template may be, for example, a representation of a ruler, a set square, a compass, or other drawing instrument that is presented or displayed on a display screen. Movement or position associated with the optical digital ruler is used to determine coordinates on the canvas for positioning a template. In some implementations, a template is manipulated by moving the optical digital ruler to position a template edge(s) on a background such that the user can utilize the template edge(s) to draw a straight or otherwise precise stroke. Upon the template being positioned in a desirable location, as a user applies a stroke path (e.g., using a stylus or other input device associated with a device), a drawing stroke is generated and presented along the template edge. That is, a drawing stroke is provided that aligns with or abuts the template edge even though the stroke path may be separate or removed from the template edge (e.g., either partially or entirely). For example, when a movement of the stylus is translated into coordinates on the display within proximity of a template edge, but does not necessarily have coordinates that touch the template edge, a corresponding drawing stroke is presented along the template edge to effectuate a precise stroke desired by the user.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 2 is a flow diagram showing a method for facilitating performance of optical digital ruler functionality, in accordance with embodiments of the present invention;

FIG. 3 is a flow diagram showing another method for facilitating performance of optical digital ruler functionality, in accordance with embodiments of the present invention;

DETAILED DESCRIPTION

Figure 1:
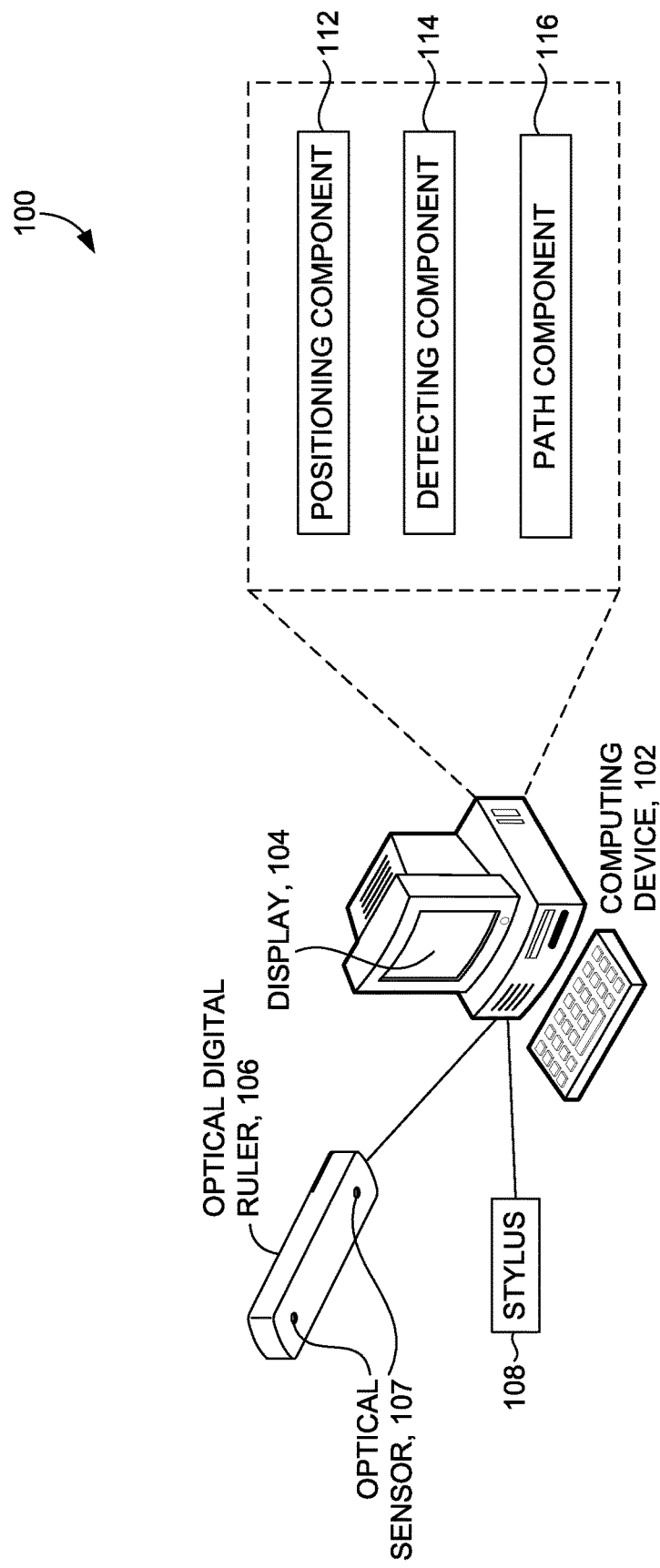
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Some drawing services, such as the ADOBE LINE and ADOBE SKETCH, have been developed that provide mechanisms for users to generate drawings or sketches in an electronic format. Oftentimes, however, drawing strokes generated by a user within a drawing application do not turn out as intended by a user as the drawing stroke is not as precise as desired by the user. For example, assume that a user wishes to draw a straight line. Although a user may interact with a stylus in a generally straight line as determined by translation of the interaction into coordinates on a display, variations in motion and/or a slant of the motion can result in a drawn line that is not as straight as desired by the user. Some hardware rulers, such as the ADOBE SLIDE, have been developed for use as a digital ruler to facilitate drawing straight lines or other precise shapes within drawing applications. To this end, a user can place a hardware ruler over a touchscreen display to draw straight lines on a canvas or background. Some users, however, may not have access to such a touchscreen display making it difficult to create precise drawing strokes. Even if these users have access to a touchscreen display, the touchscreen display may be too small to accommodate the use of a touch-based hardware ruler, such as the ADOBE SLIDE. Further, some users may need access to a larger display than is currently available in touchscreen displays.

Embodiments of the present invention are directed to facilitating drawing strokes with precision utilizing an optical digital ruler. An optical digital rule is a device that includes at least two optical sensors to control placement of an electronic template used to draw precise strokes. In this regard, a user can effectuate straight lines or other precise shapes when the optical digital ruler is activated (e.g., turned on or activated with a control on the optical digital ruler, paired with a computing device, or otherwise in communication with the computing device). The optical digital ruler can be utilized even when a touchscreen device is not available or when a display is too small for a touch based device. In accordance with implementations described herein, the user can specify a particular template to utilize for drawing a specific line or shape. A template may be of any shape, size, or form including, for example, a line, polygon, or other predefined shape. An optical digital ruler can then be used to position or otherwise manipulate the template in accordance with a user's preferences to draw a precise stroke. To do so, movement and/or positions associated with the optical digital ruler can be translated into coordinates on a canvas provided via a display or a display screen. In embodiments, the display is a non-touchscreen enabled display. Upon positioning the template over the canvas in accordance with the coordinates, a drawing stroke that aligns with a template edge can be initiated by providing a stroke path (e.g., using a stylus or other input device) that corresponds to the template. That is, a user can interact with the stylus to create a path that is interpreted to have coordinates on the canvas near an edge of the designated template to draw a stroke that precisely aligns with the template edge. As can be appreciated, the stroke drawn on the canvas aligns with the template edge to generate a precise drawing stroke (e.g., a straight line) without the user being required to input a stroke path (e.g., using a stylus or other input device) in such a precise manner.

Figure 7:
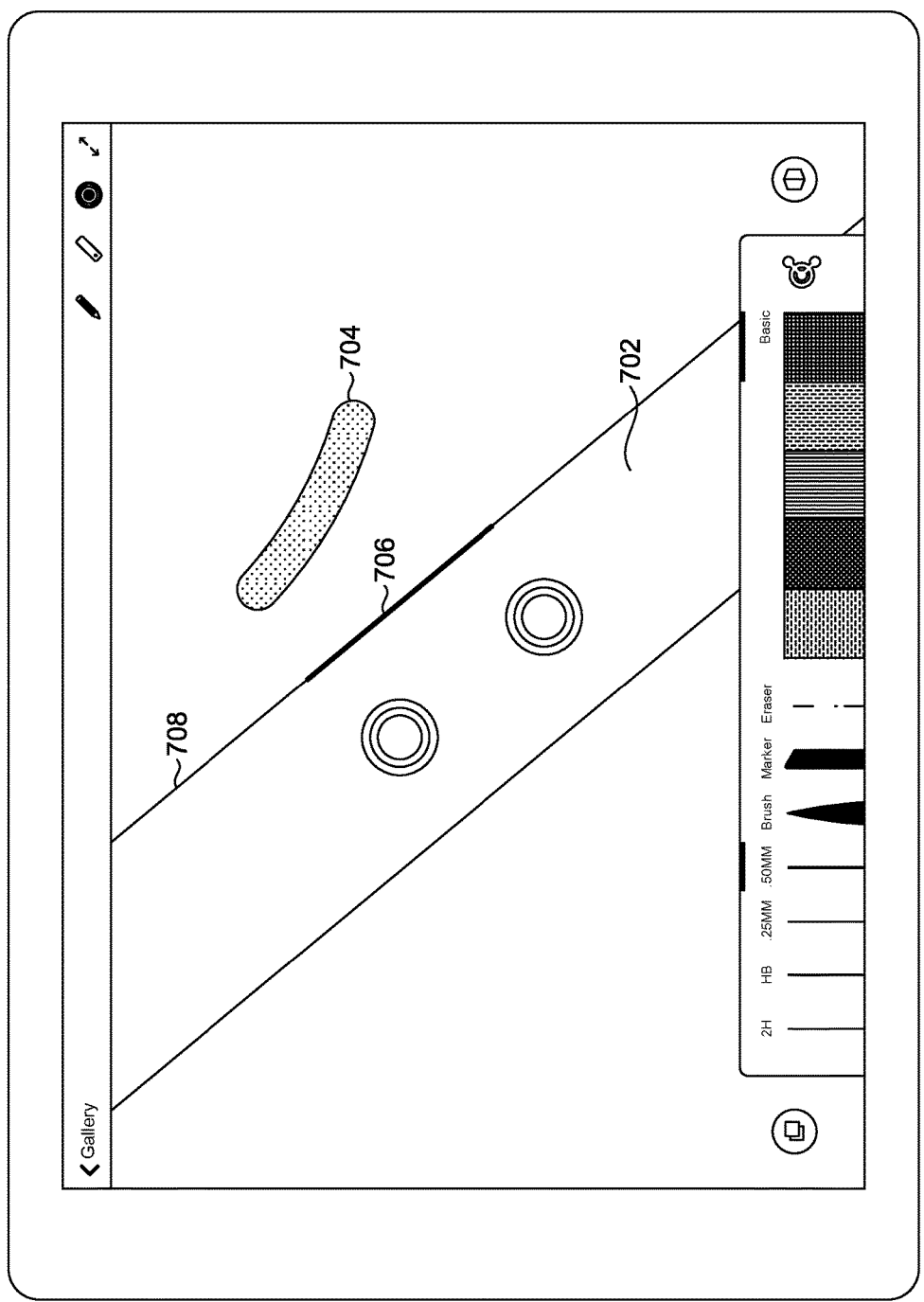
FIG. 7 is an exemplary graphical user interface illustrating a drawing stroke aligned with a template based on a stroke path, in accordance with embodiments of the present invention.
Figure 8:
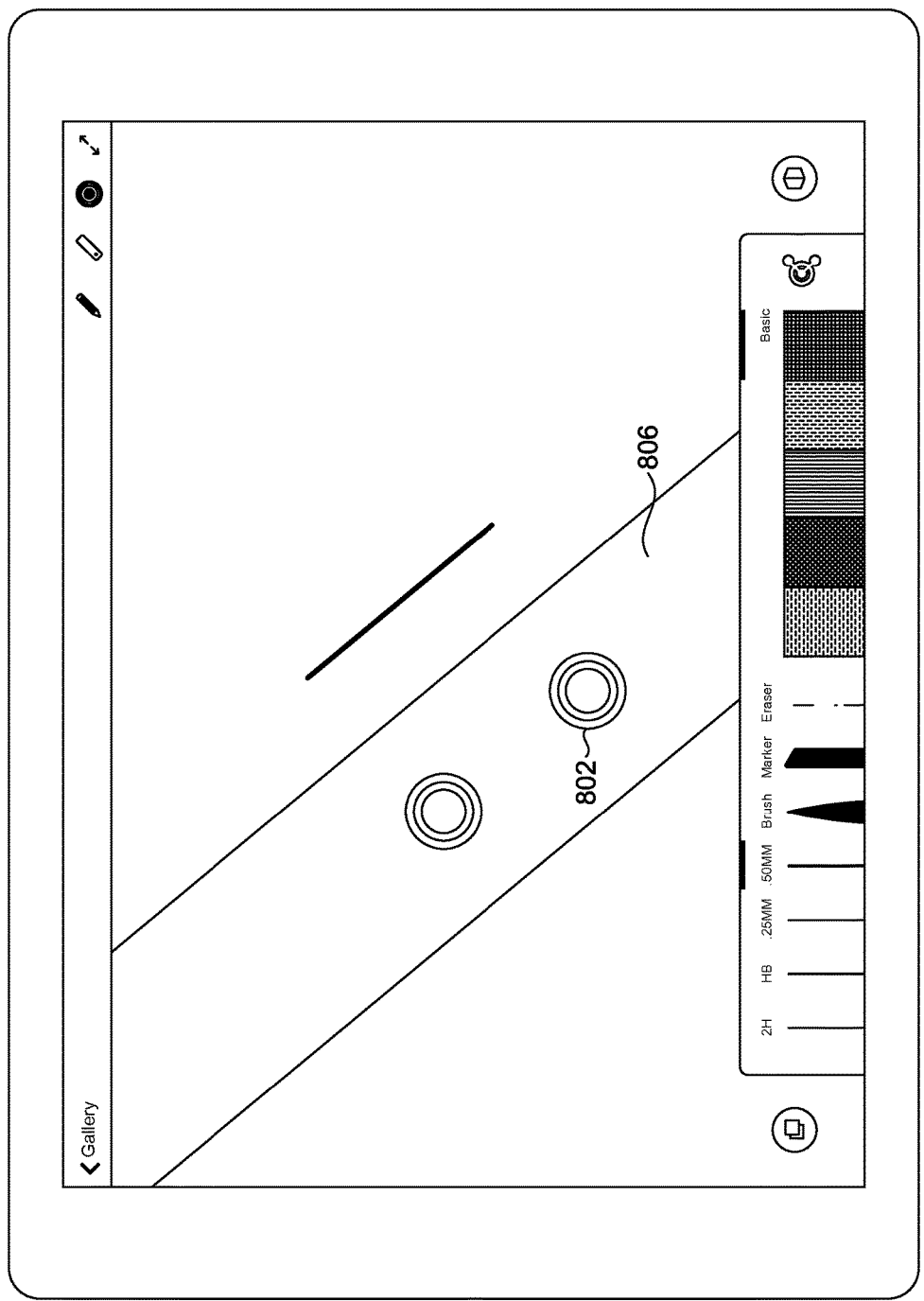
FIG. 8 is an exemplary graphical user interface illustrating positioning of a template to generate parallel lines, in accordance with embodiments of the present invention.

By way of example, and with reference to FIG. 7, assume that a particular template 702 is positioned via an optical digital ruler. As described in more detail below, templates are positioned, in embodiments, by physical movement and rotation of the optical digital ruler. Further assume that a user interacts with a stylus to create a stroke path 704 having coordinates that is generally positioned near an edge 706 of the template 702. In accordance with embodiments of the present invention, although the stroke path 704 does not fall precisely on the template edge 706, as the user moves the stylus in a motion translated to have coordinates along the stroke path 704, a drawing stroke 708 aligning with or contouring the template edge 706 is generated. In this way, the drawing stroke 708 is formed in a straight line at a particular position even though the stylus motion or stroke path may be irregular, that is, does not precisely form a straight line.

Although the description provided herein is generally directed to an optical digital ruler in association with a drawing application or service, as can be appreciated, the optical digital ruler described herein could be used in association with other types of applications or services, such as photo editing applications, electronic documents, or the like. As such, in addition to a drawing environment, the optical digital ruler may be utilized in any number of environments including any non-drawing environment such as, for example, images, web content, text, photographs, documents, or the like.

In accordance with embodiments of the present invention, FIG. 1 illustrates an exemplary system 100 that is utilized to implement an optical digital ruler. The computing device 102 can be any device associated with a display screen 104, such as the computing device 1100 of FIG. 11. The display screen 104 is a screen or monitor that can visually present, display, or output information, such as, for example, drawings, sketches, images, text, figures, values, symbols, videos, video clips, movies, photographs, lists, data sets, webpages, emails, text messages, notifications, or any other content. In some embodiments, the computing device 102 is a portable or mobile device, such as a mobile phone, a personal digital assistant (PDA), a video player, a laptop, or any other portable device associated with a display screen. In some implementations, the computing device 102, such as a portable device, includes the display screen 104. That is, a display screen is integrated or coupled with the portable device. In other implementations, a display screen 104 is remote from, but in communication with, the computing device 102 (e.g., workstation).

The display screen 104 may be, in one embodiment, a non-touchscreen enabled display and lack the features described below that may be associated with a touchscreen display. In another embodiment, the display screen 104 may be a touchscreen display. For clarity, a touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. Touchscreen displays can be implemented using any of a variety of touchscreen technologies. By way of example, and not limitation, a touchscreen display might be based on various touchscreen technologies such as resistive, surface-acoustic wave, capacitive, infrared, optical imaging, dispersive signal technology, acoustic pulse recognition, and other technologies known in the art.

The optical digital ruler 106 is generally configured to facilitate generating a precise drawing stroke or set of strokes. Generally, the optical digital ruler 106 is used to position an electronic template that is used to draw precise strokes. As such, upon translating the movement and/or position(s) of an optical sensor(s) associated with the optical digital ruler into coordinates on the canvas for use in positioning a template, a stylus or other input device may be utilized to draw one or more drawing strokes that align with the template. In some cases, in the alternative or in addition to manipulating a template, the optical digital ruler 106 is utilized to perform the drawing functionality. For example, the optical digital ruler 106 might include a control that provides functionality within drawing and/or editing software for effectuating one or more drawing strokes. In other cases, the stylus 108 or other input device might be utilized to effectuate the one or more drawing strokes. Irrespective of whether the optical digital ruler 106, a stylus 108, or other input device is utilized to perform the drawing stroke, a user of the computing device 102 can view the drawing, and strokes performed in accordance therewith, via the display 104.

Figure 12A:
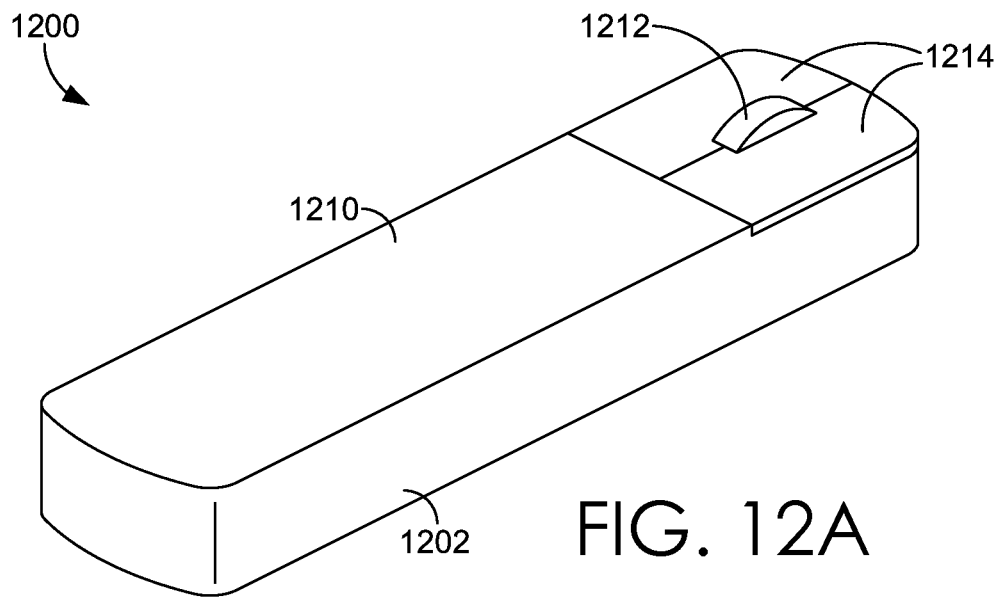
FIG. 12A is a schematic three-dimensional view from above of an optical digital ruler, in accordance with embodiments of the present invention.
Figure 12B:
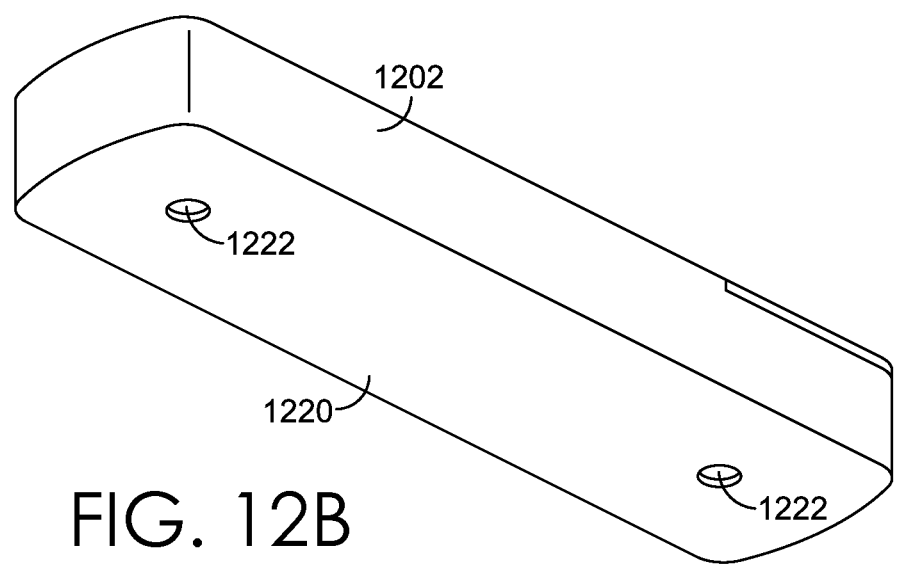
FIG. 12B is a schematic three-dimensional view from below of an optical digital ruler, in accordance with embodiments of the present invention.

As shown in FIGS. 12A and 12B, the exemplary optical digital ruler 1200 comprises an elongated body 1202. The optical digital ruler 1200 has at least two optical sensors 1222 on a desktop surface 1220 of the body 1202. The optical sensors 1222 may be any type of light detector or image sensor that detects movement relative to a surface. For example, the optical sensors 1222 may include tiny low-resolution video cameras that take successive images of the surface on which the optical digital ruler 1200 operates. These images are utilized to detect movement of the optical digital ruler and allow the positioning component 112 of FIG. 1 to translate movement and/or position(s) of the optical digital ruler 1200 into coordinates of a display screen or a canvas provided via a display, such as display 104 of FIG. 1. In embodiments, the optical digital ruler 1200 includes one or more mechanical buttons 1214 connected to a top surface 1210 opposing the desktop surface 1220. The one or more mechanical buttons 1214 may be utilized to provide additional features or any of the functionality of the optical digital ruler 1200 as described herein. In embodiments, the optical digital ruler 1200 includes a mechanical wheel 1212 connected to a top surface 1210 opposing the desktop surface 1220. The mechanical wheel 1212 may be utilized to provide additional features or any of the functionality of the optical digital ruler 1200 as described herein.

In an exemplary embodiment, each of the optical sensors 1222 comprises a light emitting diode (LED) and a complementary metal oxide semiconductor (CMOS). Each optical sensor may further comprise or share a digital signal processor (DSP). The LED is configured to emit a light onto a surface that, upon reflecting off the surface is received by the respective CMOS as an image. This may occur thousands of times a second. Each image is provided to the respective or shared DSP for analysis. In this way, the DSP is able to detect patterns and images and can determine if the optical digital ruler 1200 has moved, what distance it has moved, and at what speed. The DSP may communicate with one or more components of FIG. 1 to determine coordinates of a representation of the optical digital rule 1200 (i.e., a template) to display on a display screen, such as display 104 of FIG. 1.

In accordance with the optical digital ruler 1200 comprising two optical sensors 1222, rotation of the optical digital ruler 1200 via the optical sensors may also be translated by, for example, the positioning component 112 of FIG. 1, into rotation on the canvas. In this regard, movement of the two optical sensors 1222 relative to each other is translated into rotation on the canvas. Although FIGS. 1 and 12B illustrate two optical sensors, any number of optical sensors is contemplated to be within the scope of embodiments of the present invention.

The optical digital ruler 106 is generally configured to enabling precise drawing of a stroke(s) on a canvas or background using an input stroke. As described in more detail below, in one implementation, placement of a stroke aligns with or contours an edge of a template positioned on the canvas. In this regard, the optical digital ruler 106 can be used to position a template on the background in a location at which a user desires to draw a precise stroke and, thereafter, initiate a stroke drawing via an input stroke proximate to the template.

A template refers to any line or shape that can be used to draw a stroke over a background or canvas. In this way, a template is presented that can be "traced" by a user to result in a precise or predetermined line or shape. A template can take on any shape, size, or form, such as, for example, a rotation or circular pattern, a straight line pattern, a polygonal shape, a pattern form, or any shape or object. In this regard, a template may be, for example, a representation of a ruler, a set square, a compass, or other drawing instrument that is presented or displayed on the display screen 104. Generally, a template is formed from one or more template edges, which may also be of any shape, size, or form. For instance, a template edge might be a straight, curved, zig-zag, patterned, or the like.

Generally, a user indicates or initiates a stroke path in association with a template in some manner. For instance, a user may contact a finger on a touchscreen and move the finger in proximity to a template edge to generate a drawing stroke that aligns with the template edge. As another example, a user might move a selector in proximity to a template edge via a stylus or other input device to generate a stroke that aligns with the template edge. In yet another example, a user might move an optical digital ruler (e.g., while a control is pressed or selected) to generate a stroke that aligns with the template edge. A stroke or drawing stroke can be presented on a background having any width, length, color, pattern, etc. A background or canvas refers to a background view that can have content (e.g., strokes) presented over the background. As can be appreciated, the background or canvas can be of any size, shape, color, pattern, image, etc. By way of example, a user may select a background, such as a patterned background. Upon selecting a background, a user may initiate various strokes in association with a template positioned via an optical digital ruler 106 to overlay the background in a precise manner.

In operation, and at a high-level, a computing device 102 detects an interaction with an optical digital ruler 106. For example, an optical digital ruler 106 may be paired or otherwise in communication with the computing device 102. The optical sensors 107 of the optical digital ruler 106 may detect movement and/or position(s) associated with the optical digital ruler 106. The movement and/or position(s) may be translated by the positioning component 112 into coordinates of a display screen or canvas provided by the display 104 of the computing device 102. The coordinates may be utilized to position a desired template, described in more detail below, on the canvas. The positioning component 112 may be provided by the computing device 102, in one embodiment, or the optical digital ruler 106, in another embodiment.

As shown in FIG. 1, the optical digital ruler system 100 includes a positioning component 112, a detecting component 112, and a path component 114. It should be understood that this and other arrangements described herein are set forth only as examples. Although each of the components are illustrated as being associated with the computing device 102, it should be appreciated that each or all of the components may additionally or alternatively be associated with the optical digital ruler 106. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In some embodiments, application of the optical digital ruler 106 is enabled upon detecting a user indication to apply the digital ruler. A user might provide such an indication in any manner. For example, a user may select a "digital ruler" or "optical digital ruler" icon or setting (e.g., in the navigation bar) or a control on the optical digital ruler 106 to initiate the optical digital ruler. In other embodiments, application of the optical digital ruler 106 is enabled automatically. For example, in accordance with the optical digital ruler 106 pairing or otherwise being in communication with the computing device 102, utilization of the optical digital ruler 106 may automatically be enabled.

As briefly described above, the positioning component 112 is configured to translate movement and/or position(s) of the optical sensors 107 associated with the optical digital ruler 106 into coordinates on the canvas at which to present a template. In this regard, the positioning component 112 can translate or determine coordinates on the canvas at which to position a template in accordance with translations and/or rotations of optical sensors 107. As mentioned above, the optical sensors 107 may include tiny low-resolution video cameras that take thousands of images per second and detect patterns in the images. Upon determining how the patterns have changed over a sequence of images, movement and speed can be calculated, such as with the positioning component 112, and translated into coordinates on the canvas. The coordinates at which to present a template may be represented by optical points associated with the template being applied to the canvas. Movement of the template, or optical points associated therewith, is based on a user interaction with the optical digital ruler 106, such as by moving the optical digital ruler 106 in communication with a computing device. Rotation of the template is accomplished because the optical digital ruler 106 has at least two optical sensors. In this regard, physical rotation of the optical digital ruler 106 causes a corresponding rotation of the template on the canvas. As previously described, the optical digital ruler 106 is generally configured to enable positioning of a template on a canvas or background such that a precise stroke can be drawn to align with an edge of the template.

Figure 9:
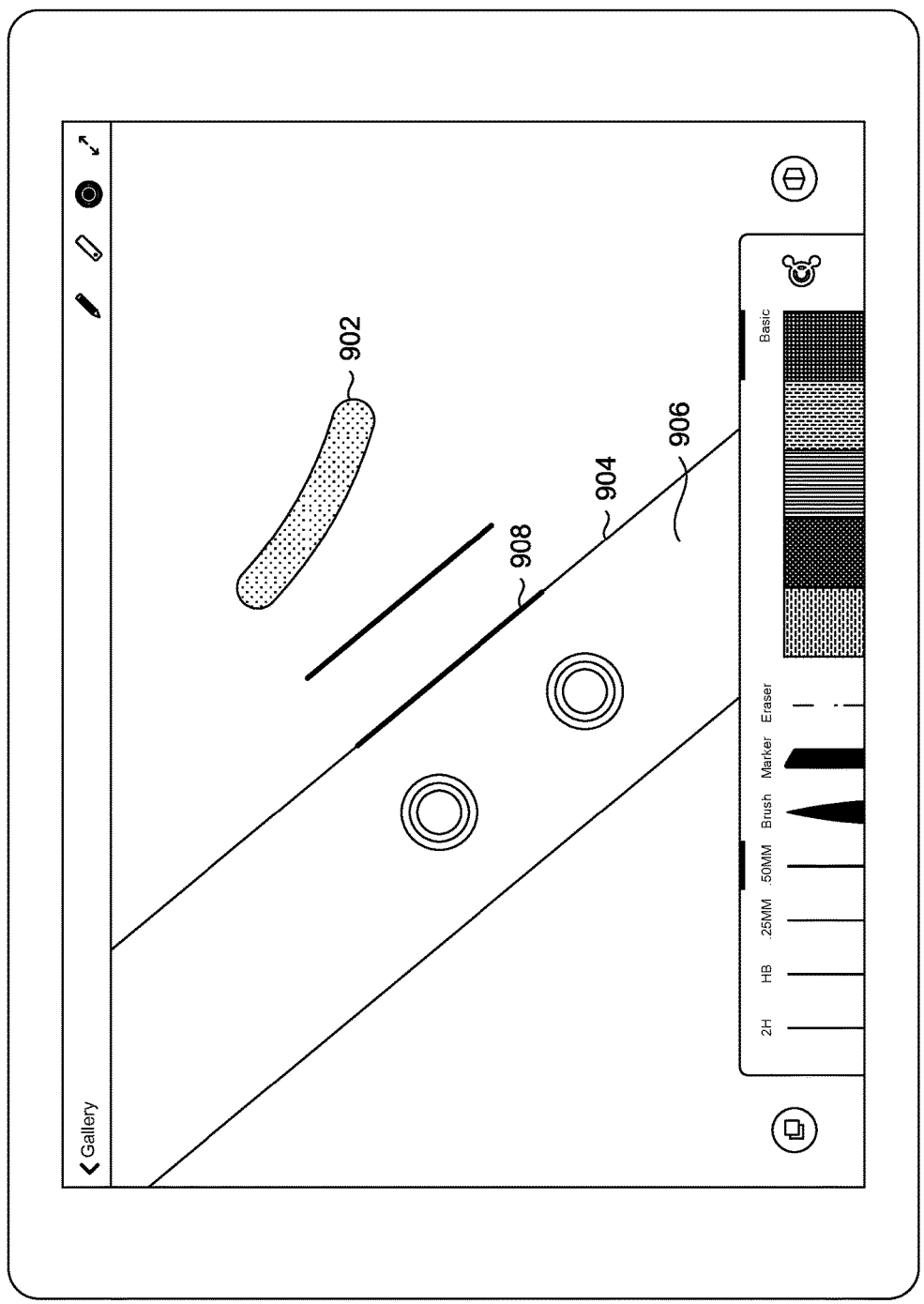
FIG. 9 is an exemplary graphical user interface illustrating a drawing stroke aligned with a template based on a stroke path to generate parallel lines, in accordance with embodiments of the present invention.

The positioning component 112 is further configured to position an electronic template on a canvas or background in accordance with the coordinates. The electronic template is utilized to generate a precise drawing stroke and can be positioned on a canvas according to a preferential or desired placement of a user, as manipulated by moving or rotating the optical digital ruler 106. A template can be any template that can be used to draw a stroke over a background or canvas. That is, a template can be "traced" to generate a precise stroke. As previously described, a template can take on any shape, size, or form, such as, for example, a circular pattern, a straight line pattern, a polygonal shape, a pattern form, an object, or the like. In some cases, a template can take on the form of an image or item such that it represents a particular object or item as opposed to a generic shape or form. For instance, a template may represent a chair, a person, a car, or any other object or set of objects. One exemplary form of a template can take on the shape of a conventional ruler. That is, a template may be illustrated as two parallel lines with a particular distance between the parallel lines (e.g., one inch), as illustrated in FIG. 9, for example.

In some embodiments, a particular template to utilize for drawing a stroke(s) can be selected by a user. Such a template selection may be made in any manner. For instance, a user may select an icon or representation of a particular template desired for use by selecting the corresponding icon or representation. In some cases, a user may rotate through a set of templates by interacting with a control (e.g., a wheel or button) associated with the optical digital ruler 106. In another example, and referring to FIG. 5, a user may select or interact with, such as by utilizing a stylus, mouse, touch input, or other input device, a first optical point 504 to rotate through a set of available templates and select a second optical point 506 to rotate in the opposite direction through the set of available templates. Generally, an optical point refers to a visual representation presented on a display screen that corresponds to the translated coordinates of the optical sensors 107 of the optical digital ruler 106 and can, in some embodiments, in addition to movement of the optical digital ruler 106 itself, be used to control or manipulate a template in some manner as described herein. An optical point may be represented in any manner, such as, for example, a shape, a ring, an object, an icon, a symbol, a color, etc.

Upon identifying a particular template to use, the specific template that the user wishes to utilize may be selected in any manner, such as, for instance, a control (e.g., a wheel or button) associated with the optical digital ruler 106, a stylus 108 interacting with the template, other input devices associated with the computing device 102, or the like. Utilizing a control associated with the optical digital ruler 106, a stylus 108, or other input devices to view and/or select a template is only one implementation contemplated by the inventor and embodiments described herein are not limited hereto.

In some cases, a default template may be automatically selected for display. Such a default template may be the only available template for use or may be the initial template displayed to the user. In the latter case, the user may then select an alternative template to replace the initially presented default template. For instance, a template representing a traditional ruler may be initially displayed. Upon display of the initial ruler, the user may select to change the specific template used, for example, to a circular shape, rectangular shape, triangular shape, or the like. As described above, such a template selection may be made via a control associated with the optical digital ruler 106.

As mentioned briefly above, the positioning component 112 is configured to position a template over a canvas. The positioning component 112 can position a template in any number of ways based on user interactions with a template, an optical point, the optical digital ruler 106 or other input device, and/or a touchscreen. In this regard, the positioning component 112 can translate, rotate, scale, and/or transform a template in accordance with user interaction. Accordingly, a user can position a template according to his or her preferences on a canvas. Such manipulations to a template can be performed in any number of manners, and the examples provided herein are merely exemplary in nature.

A template may be manipulated on the display based on an input to align a template as desired. In this regard, a template may be moved up, down, and/or to the side in a desired direction. In some embodiments, a template, or portion thereof, can be manipulated using the optical digital ruler 106. That is, movement of the optical digital ruler 106 can be translated to specifically position a template, or template edges in accordance with coordinates provided by positioning component 112 based on user interaction with the optical digital ruler 106. The optical digital ruler 106 may have a control that allows a user to position a single optical point at a time. For example, a portion of the template (e.g., one of the optical points) may be in a desired position on the canvas. The user may desire to move the other portion (e.g., the other optical point). In this regard, the user may select a control (e.g., a mechanical button on the optical digital ruler or by selecting an icon on the user interface) that freezes the desired portion of the template on the canvas, while allowing the user to reposition the other portion of the template by moving or rotating the optical digital ruler 106. For example, the user may desire to move the placement of one of the optical points on the canvas without moving the other optical point(s). By selecting a mechanical button on the optical digital ruler 106 (or selecting an icon on the user interface) that freezes a selected optical point on the canvas, the user may then reposition the other optical point(s) to a desired location by moving or rotating the optical digital ruler 106.

Similarly, the template may be moved up, down, and/or to the side by dragging or pulling the template with another input device (e.g., mouse, touch input, and the like). As can be appreciated, such manipulation may occur when contact (i.e., touch input) or selection (e.g., mouse, stylus, optical digital ruler, or other input device) is made, for instance, with any portion of a template, with a particular area of a template, or the like. Movement of or interaction with a single optical point displayed on the canvas, as described above, may be used to effectuate manipulation of the template. For clarity, movement of or interaction with an optical point in any of the examples described herein may occur based on touch contact with the optical point or selection or interaction with the optical point via mouse, stylus, optical digital ruler, or other input device. Use of a single optical point to manipulate a template may be used to constrain rotation of the template and thereby maintain a parallel template upon movement of the template. In effect, when a user only interacts with a single optical point, the parallel axis remains intact as the template is moved in various directions. Other implementations to manipulate a template may additionally or alternatively be used, such as, for instance, manipulation of multiple optical points.

A template may also be rotated to align the template as desired by the user. In this regard, a template may be rotated any number of degrees by moving or rotating the optical digital ruler 106 in a desired rotation or direction. As can be appreciated, such a rotation may additionally or alternatively occur when interaction is made, for instance, with an optical point, with multiple optical points, with any portion of a template, with a particular area of a template, or the like such as may occur based on a touch input or user interaction with a mouse, a stylus, and/or another input device. Movement of both optical points displayed on the canvas in a rotational manner (e.g., dragging with a mouse, stylus, touch input, or other input device) may be used to effectuate rotation of the template. Use of two optical points to rotate the template may be used to distinguish from manipulation of the template using one optical point. Other implementations to rotate a template may additionally or alternatively be used, such as, for instance, manipulation of a single optical point.

The template may also be scaled or sized as needed by the user. In this regard, a template may be increased or decreased in size via a control (e.g., a wheel or mechanical button) on the optical digital ruler 106 or other input. As can be appreciated, such a scaling may occur when contact or interaction is made, for instance, with an optical point, with multiple optical points, with any portion of a template, with a particular area of a template, or the like. For example, movement of both optical points displayed on the canvas (e.g., dragging with a mouse, stylus, touch input, or other input device) may be used to effectuate scaling of the template by moving the optical points closer together or further apart to decrease or increase the size of the template, respectively. Other implementations to scale a template may additionally or alternatively be used, such as, for instance, manipulation of a single optical point.

As can be appreciated, in some cases, a template may be desired to be transformed or skewed. For example, a user may desire to transform an equilateral triangle template to an isosceles triangle template. In such a case, the user may wish to transform one or more edges of the template to generate the desired triangle. Transformation may occur in any number of manners including, movement of one optical point or two optical points or manipulation of the template. In some cases, a user may select a template edge for a predetermined or threshold amount of time and, upon exceeding a threshold time, manipulate the edge (e.g., dragging with a mouse, stylus, touch input, or other input device) to the appropriate size, position, etc. For instance, upon selecting or interaction (e.g., via a mouse, stylus, touch input, or other input device) with a template edge for two seconds, the template edge may turn a color (e.g., blue) indicating the template edge may be manipulated to transform the template, or portion thereof.

Alignment guides may also be used to more precisely draw one or more strokes. Alignment guides facilitate connecting end points or other points (e.g., a mid-point) such that two lines can intersect appropriately. For example, alignment guides may be presented when two lines are approximately 90 degrees or 45 degrees relative to one another. That is, when a user moves a template to a location in which at least a portion of the template is near an intersection with a particular aspect of a drawing stroke, such as an end point, the template may automatically move or "snap" to the particular aspect (e.g., end point) of the drawing stroke such that the template edge connects or intersects to the drawing stroke. In some cases, alignment guides are presented in association with a previous stroke and/or the template to visually represent an intersection (e.g., a 90 degree angle between a template edge and a previous drawing stroke).

The detecting component 114 and the path component 116 are configured to initiate and perform drawing functionality, respectively. In embodiments, path component 116 draws a stroke in accordance with a detected path detected by the detecting component 114. In accordance with implementations described herein, a stroke(s) can be drawn on the canvas to align with a template edge that is positioned in accordance with a user's preference. As a result, a stroke is drawn in a precise manner, such as a straight line. Such a stroke or drawing stroke refers to the actual line or drawing representation this is presented on the background or canvas.

Initially, detecting component 114 may identify the stroke path, or portion thereof. That is, the detecting component 114, or other component in communication therewith, may detect at least a portion of a stroke path being traversed, for example, in accordance with an interaction with the optical digital ruler 106, a stylus 108, or other input associated with the computing device 102. A stroke path refers to any path designated for drawing at least a portion of content (e.g., a drawing or sketch). A stroke path can take on any shape, pattern, or form such as, for example, a rotation or circular pattern, a line pattern, a polygonal shape, a free-form shape, or the like.

Various stroke data might be used to detect a stroke path. For example, a position indicator refers to an indication of a position, location, or area of a stroke path, or portion thereof (e.g., coordinates of a canvas associated with a display). Accordingly, a position indicator might be a pixel (s) or an x and/or y coordinate associated with an interaction (e.g., an x and/or y coordinate of a pixel that corresponds with a user interaction associated with a stylus or other input device), or the like. Additional or alternative data may be used in detecting a stroke path. For example, a direction indicator refers to a direction of a stroke path. A velocity indicator refers to a velocity in which a stroke path is performed. An acceleration indicator refers to an acceleration of a stroke path. A magnitude indicator refers to a magnitude, distance, extent, displacement, or degree of a stroke path. A stroke path can be provided in any number of formats including a touch gesture indicated through a touch interface, an air gesture indicated by a user made in space, a mouse or stylus gesture indicated through a selector or cursor, an optical device such as the optical digital ruler (e.g., upon selection of a control), or the like.

The path component 116 might receive, retrieve, or access signals associated with stroke data from detecting component 114. In embodiments, stroke data might be raw data generated by one or more input devices, such as stylus 108 associated with computing device 102. Alternatively or additionally, stroke data may be derived, calculated, identified, or determined, for example, based on raw data generated by stylus 108 or other input devices. That is, signals generated from stylus 108 may be processed to identify stroke data. By way of example only, signals received by the path component 116, or another component, can be processed to determine x and/or y coordinates identifying locations that correspond with an area of a canvas associated with the display interacted with by the stylus 108. Any algorithm and/or lookup technique can be utilized to normalize, determine, calculate, identify, and/or derive various types of stroke data.

Upon detecting a stroke path, or portion thereof, a determination may be made as to whether to draw the stroke in association with a template edge. Any number of technologies may be used to distinguish between a stroke to align with the template edge and a stroke to be drawn in a free-form manner. In some implementations, the detecting component 114 and/or the path component 116 may initiate and/or draw a stroke in association with a template automatically. For example, in some cases, a stroke may be automatically drawn in alignment with a template edge when the optical digital ruler is activated, when the template is presented on the display screen, or the like.

In some implementations, the proximity or distance between the stroke path and a template edge can be used to determine whether the drawing stroke should be drawn in accordance with the particular template edge. For instance, a stroke path within a predetermined distance or proximity from a template edge may be deemed to correspond or overlap with the template edge such that the drawing stroke contours the template edge. By way of example, and not limitation, a template edge being within a predetermined proximity of pixels or coordinates associated with a stroke path, or portion thereof, can be deemed as an indication to draw a stroke that aligns with the template edge. To the extent the stroke path is deemed to correspond, overlap, or coincide with the template edge, the stroke is drawn along the template edge as the stroke path is traversed.

In yet another implementation, a stroke path detected within or touching the boundaries of a template may be deemed to be a stroke path intended to draw a stroke that aligns with the template edge, while a stroke path detected outside the boundaries of the template may be deemed to be a free-form stroke path that does not automatically align with the template edge. In this manner, a drawing mode is detected based on a location or position selected or at which a stroke path exists. In this regard, whether or not a stroke is drawn to contour a template edge can be triggered based on a location or position selected or at which a stroke path traverses. In such embodiments, when a location or position at which a stroke path traverses corresponds or aligns with a template or template edge, a stroke is drawn that aligns with template edge. In effect, by selecting or providing a stroke path that contacts or is proximate to a template, the user is designating a drawing stroke to align with the template regardless of the path of the stroke input by the user. In contrast, when a location or position at which a stroke path is traversed does not correspond, align, or overlay a template, or otherwise indicate a desire to align a stroke with a template edge, a free-form stroke may be detected and applied. Stated differently, when a selection or a stroke path exists at a location that does not align with any template or template edge, a free-form stroke can be applied. In this regard, the drawing stroke aligns with the actual stroke path and not a template or template edge.

As can be appreciated, selection or an indication of a stroke to align with a template edge may be provided in any manner. For instance, a user may contact a touchscreen at a location of a template, click on a template or template edge using a pointer or selector (e.g., mouse or stylus), begin a stroke path within one or more template boundaries, begin or perform a stroke path within a predetermined vicinity of a template or template edge, etc. Selection to align a stroke with a template edge may be discrete from performance of a stroke path or continuous with providing a stroke path. That is, a user may provide a single contact or interaction with a template to indicate a desire to utilize a template edge to generate a drawing stroke, remove contact or interaction with the template, and then designate a stroke path, for example. Alternatively, a user may provide an initial contact or interaction with a template edge to select the template edge to which to align and, thereafter, continue performance of the stroke path to draw the stroke without removing contact or interaction until completing the stroke path.

Other methods can be used to detect or determine whether to align a drawing stroke with a template edge. For example, use of a template may be selected by a user for application. In such an example, a user may select, for instance, an icon indicating a desire to use a template edge to draw a line. Upon selecting such an icon, any stroke paths or any stroke paths within proximity of a template edge can be drawn to align with the template edge.

In accordance with determining to draw a stroke that aligns with a template edge, the stroke can be drawn and presented on the display screen as the user moves an object (e.g., mouse, stylus, finger, an optical device such as the optical digital ruler, or other input device) along the display, for example. That is, while a user interacts in a motion along a stroke path, a stroke can be drawn in a coordinated manner alongside the edge of a template as though the template is being "traced." The stroke can be drawn in a one-to-one correspondence (or any other scale or ratio) as the input by the user. In some cases, the specific template edge at which to draw the stroke may also be identified. Such an identification can be made in any manner, for example, including selecting a template edge that is closest or nearest the stroke path or initial interaction or contact of the stroke path.

As previously described, the path component 116 may perform the stroke drawing or initiate drawing, for example, by providing stroke details to another component that, thereafter, performs the stroke drawing. Irrespective of the component used to draw the stroke, the stroke can be formatted in any number of ways. By way of example only, a stroke can be formatted in various colors, various widths, various patterns, and/or the like. As can be appreciated, such formats may be default formats, system determined formats, or user selected formats.

Although the computing device 100 of FIG. 1 is generally described herein in accordance with utilization of an optical digital ruler to control a template and/or draw a stroke, other interactions can additionally or alternatively be used herein. For example, computing devices that accept gesture inputs or have touchscreen displays that accept touch inputs are contemplated as within the scope of embodiments described herein. In this regard, a user may interact with the touchscreen in accordance herewith to initiate drawing a stroke(s) in a precise manner. As another example, an air gesture can be detected and used in accordance herewith to initiate drawing a stroke(s) in a precise manner.

Turning now to FIG. 2, a flow diagram is provided that illustrates a method 200 for facilitating performance of optical digital ruler functionality, in accordance with embodiments of the present invention. Initially, as shown at block 202, a template is selected, via an optical digital ruler, for use in drawing precise strokes. A template may be selected, via a control (e.g., a wheel or mechanical button) on the optical digital ruler, by a user from among a plurality of templates. At block 204, the template is positioned on a background based on movement of the optical digital ruler. In this regard, the template might be positioned on a background in accordance with preferences indicated by a user. For example, a user may manipulate positioning of the template by moving the optical digital ruler. Because the optical digital ruler has at least two optical sensors, movement, including rotation, may be translated into coordinates of a template on the background and the template may be positioned accordingly. At block 206, it is identified that a stroke is to be drawn in alignment with, abut, or be alongside or over a template edge. Such an identification can be made in any manner. For instance, an identification to draw a line alongside a template edge may be based on activation of an optical digital ruler, presentation of a template, or a user selection or initiation of a stroke path being within a predetermined proximity of the template or template edge. Thereafter, at block 208, a stroke is drawn that aligns with the edge of the template. Such an alignment with the edge of the template occurs despite the preciseness of the stroke path. That is, a user may apply a stroke path that is near, but not touching, the template edge and/or that is not straight. The stroke, however, can be drawn to align with the edge of the template such that it appears in a precise manner (e.g., a straight line).

Turning now to FIG. 3, a flow diagram is provided that illustrates another method 300 for facilitating performance of optical digital ruler functionality, according to embodiments provided herein. Initially, at block 302, an electronic template is positioned on a canvas based on movement of an optical digital ruler. At block 304, it is determined whether a stroke is to be drawn to align with a template edge. In some cases, such a determination can be made based on whether an optical digital ruler is associated with a computing device, whether a template is selected for use, etc. In other cases, such a determination can be based on whether a stroke path, or initial coordinates of a stroke path, is within a predetermined vicinity of a template or template edge. If it is determined that a stroke is to be drawn to align with a template edge, a stroke is drawn alongside an edge of the template as a stroke path is traversed, as indicated at block 306. In this regard, a stroke being drawn contours the edge of the template in a precise manner. On the other hand, if it is determined that a stroke is not to be drawn to align with a template edge, a stroke is drawn that follows the stroke path, as indicated at block 308. As such, the stroke being drawn aligns with the motion of the optical digital ruler, a stylus, or other input device and does not follow the edge of the template.

Figure 4:
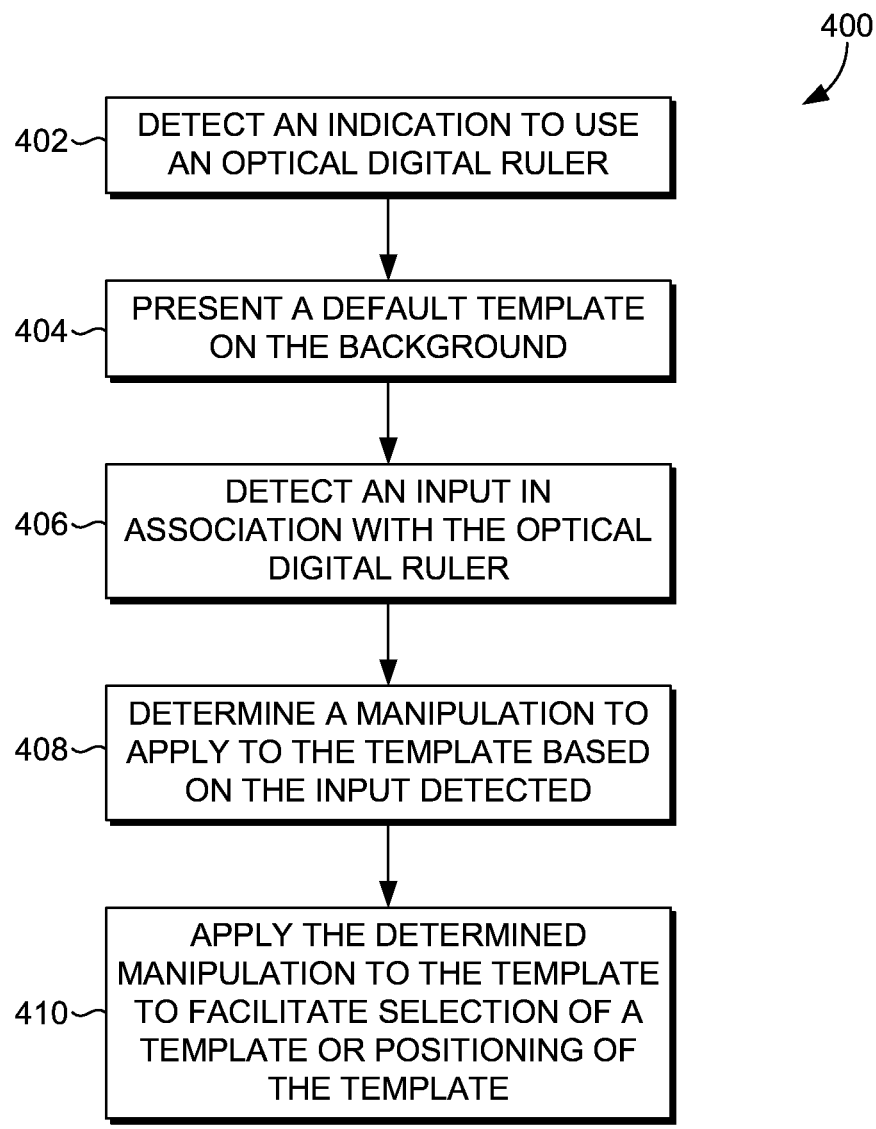
FIG. 4 is a flow diagram showing a method for manipulating a template in accordance with embodiments provided herein.

With reference now to FIG. 4, a flow diagram is provided that illustrates a method 400 for manipulating a template in accordance with embodiments provided herein. Initially, as indicated at block 402, an indication to utilize an optical digital ruler is detected. At block 404, a default template is presented on the background. The default template may have two optical points corresponding to coordinates associated with the two optical sensors of the optical digital ruler. At block 406, an input in association with the optical digital ruler is detected. In this regard, an input might be based on a control associated with the optical digital ruler that is utilized to change or otherwise manipulate the default template, such as by selecting a particular template desired by the user. Alternatively or additionally, an input might include movement of the template in some manner. For example, the template might be moved or rotated in accordance with the movement or rotation of the optical digital ruler.

Thereafter, at block 408, a manipulation to apply to the template is determined based on the input detected. By way of example, and without limitation, in some cases, a control associated with the optical digital ruler might change a template being presented or initiate a template selection (from among multiple templates). As another example, movement of a portion of the default template (e.g., a single optical point), via a control associated with the optical digital ruler, a stylus, or other input device, might trigger translation of the template, while movement of the entire default template (e.g., both optical points), via movement of the optical digital ruler, a stylus, or other input device, might trigger rotation of the template. In yet another example, movement of the two optical points away from one another, via a control associated with the optical digital ruler, a stylus, or other input device, might trigger increasing the size of the template while movement of the two optical points toward one another might trigger decreasing the size of the template. As can be appreciated, the controls (e.g., button, wheel, and the like) associated with the optical digital ruler may any or all of the manipulation described herein. The determined manipulation is then applied to the template to facilitate selection of a template or positioning of a template, as indicated at block 410.

Figure 5:
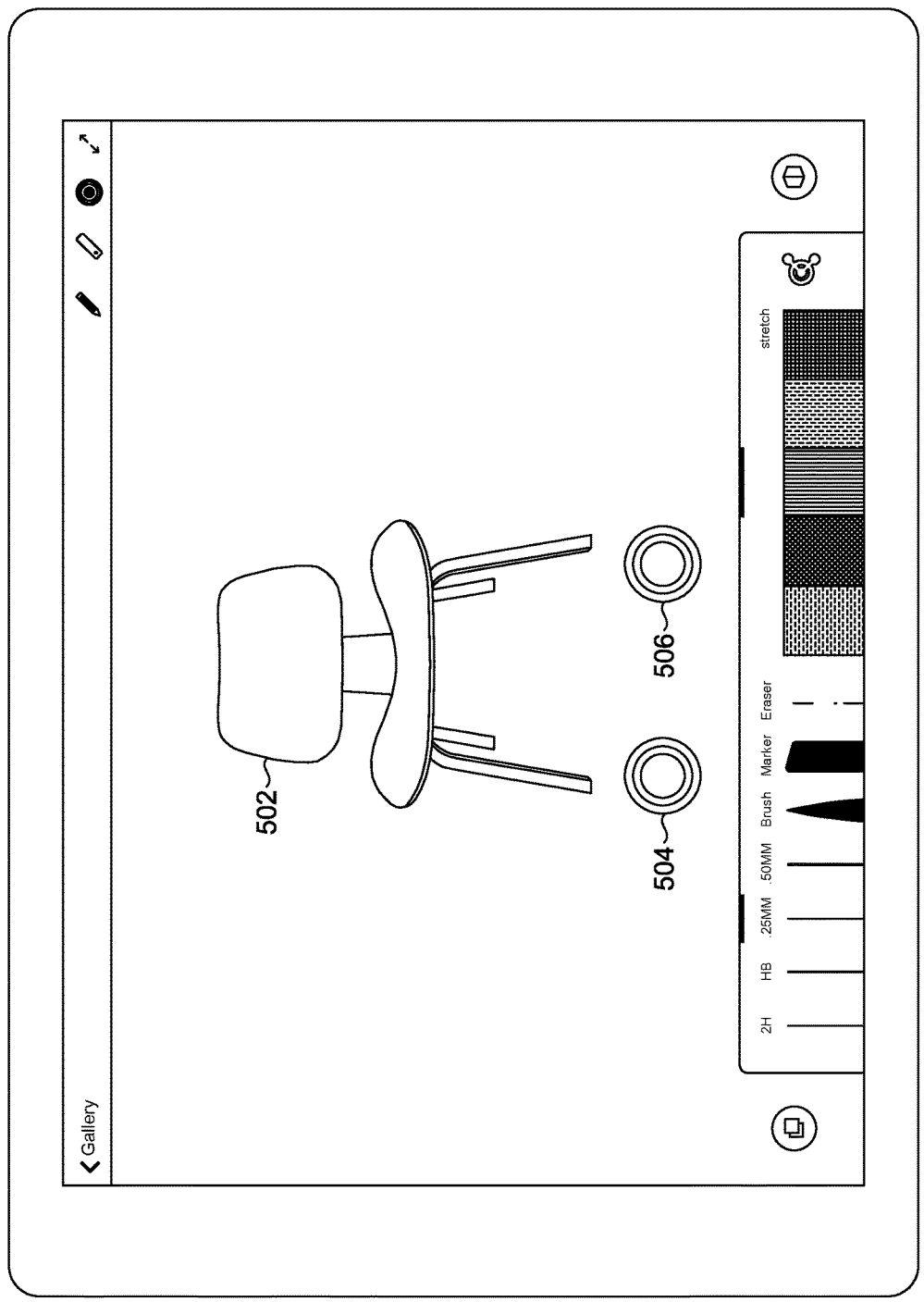
FIG. 5 is an exemplary graphical user interface illustrating a template for use in generating a precise drawing, in accordance with embodiments of the present invention.
Figure 6:
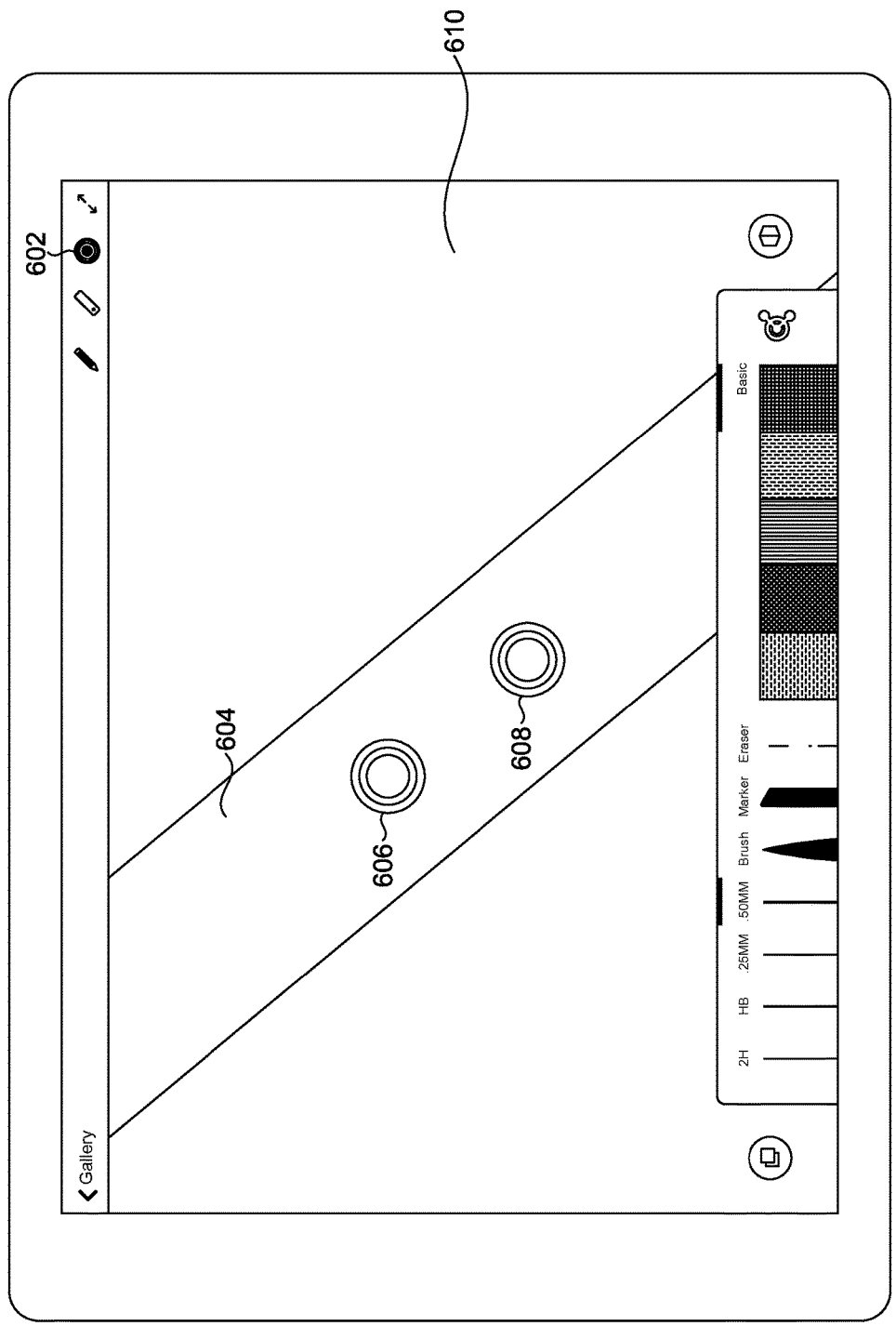
FIG. 6 is an exemplary graphical user interface illustrating another template for use in generating a precise drawing, in accordance with embodiments of the present invention.

Turning now to FIGS. 5-10, FIGS. 5-10 provide exemplary user interfaces in accordance with implementing various embodiments described herein. These are only examples and are not intended to limit the scope of embodiments of the present invention. Each of the exemplary user interfaces provided in FIGS. 5-10 represent display screen output, such as may be provided, for example, by display 104 of FIG. 1. With initial reference to FIG. 5, an example of a template 502 presented on a display screen is provided. In FIG. 5, the template 502 represents an image, namely, a chair. A user may select the template 502 from among a number of templates via a control associated with the optical digital ruler, a stylus, or other input device. For example, a user may rotate through possible templates by utilizing a button or wheel associated with the optical digital ruler. As described above, optical points 504 and 506 refer to the visual representation, as presented on a display screen, corresponding to the translated coordinates of the optical sensors of the optical digital ruler. The optical points can, in some embodiments, in addition to movement of the optical digital ruler itself, be used to control or manipulate a template in some manner. For example, the optical digital ruler may be utilized to position the template 502 on the background in accordance with a translation of the rotation and movement of optical sensors associated with the optical digital ruler. Similarly, as described herein optical points 504 and 506 can also be used to position the template 502 on the background as desired by the user, such as by moving one or both of the optical points 504, 506 based on a selection or interaction with the optical points 504, 506 (e.g., touch, mouse, stylus, optical device, or other input device). In one embodiment, the template 502 may be selected and/or moved using a stylus or other input device. Upon positioning the template 502 appropriately, the template can be used to draw strokes that align with the edges of template, as generally described above. In some cases, strokes that align with the template can be generated in accordance with stroke paths provided by the user. In other cases, strokes that align with the template can be generated by "stamping" the template on the background. Such a "stamping" action can be initiated in any manner, such as, for instance, selecting a control associated with the optical digital ruler.

Turning now to FIGS. 6-9, FIGS. 6-9 illustrate drawing precise lines using a template. Initially, a user may initiate an optical digital ruler by associating the optical digital ruler with a computing device (e.g., pairing via Bluetooth, USB, and the like). The optical digital ruler may additionally, or alternatively, be initiated by selecting an icon 602. Upon initiating the optical digital ruler, a template 604 is presented that enables a user to generate precise drawing strokes. Movement and rotation of the optical sensors associated with the optical digital ruler is translated into coordinates (i.e., the optical points) of the background 610. Accordingly, the optical digital ruler may be moved and/or rotated to position the template 604 on the background 610 according to the user's preferences. Additionally or alternatively, optical point 606 and optical point 608 can be utilized, such as by selecting and moving or dragging one or both of the optical points using a touch input, mouse, stylus, optical device, or other input device, to position the template 604 on the background 610 according to the user's preferences.

Assume now that a user desires to draw a straight line using a template. As such, as illustrated in FIG. 7, a user may utilize a stylus or other input device to create a drawing stroke along a stroke path 704. In accordance with the optical digital ruler being activated or the stroke path 704 being in proximity to the edge 708 of the template 702, a stroke 706 is drawn alongside the template edge 708 corresponding with the stroke path 704.

To draw a stroke parallel to stroke 706 of FIG. 7, the user can move the optical digital ruler parallel or approximately parallel to its initial placement. Similarly, the user can select a control (e.g., wheel or mechanical button) of the optical digital ruler that enables the movement of the template in a parallel manner. Additionally or alternatively, the user can select, such as with a touch input, mouse, stylus, optical device, or other input device, an optical point, such as optical point 802 of FIG. 8. Upon selecting the optical point 802, the user can utilize the optical digital ruler, a stylus, or other input device to move the template 806 in a parallel manner. Upon positioning the template 806 in an appropriate place to draw a parallel stroke, user can utilize the optical digital ruler, a stylus, or other input device to create a stroke path 902 of FIG. 9. In accordance with the optical digital ruler being activated or the stroke path 902 being in proximity to the edge 904 of the template 906, a stroke 908 is drawn alongside the template edge 904 corresponding with the stroke path 902.

Figure 10:
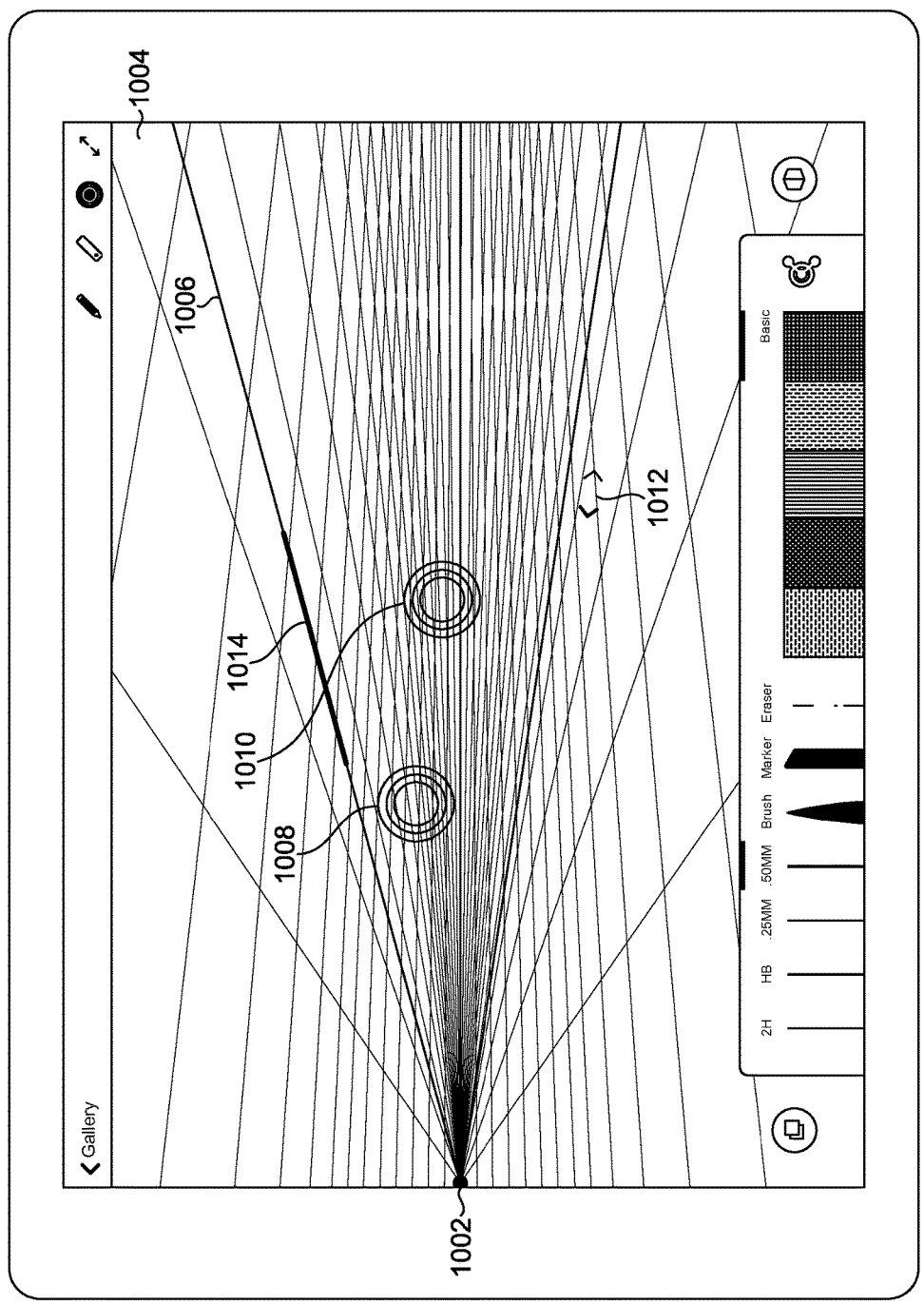
FIG. 10 is an exemplary graphical user interface illustrating utilization of an optical digital ruler to generate a perspective drawing, in accordance with embodiments of the present invention.

With reference now to FIG. 10, an optical digital ruler is provided that enables drawing in perspective using interactions with the optical digital ruler, a stylus, or other input device. Upon an initial selection to utilize a perspective mode, the user can position a vanishing point 1002 on the background 1004. Upon setting up a vanishing point in a perspective mode, when the optical digital ruler is invoked, a set of lines are presented that are parallel in perspective. As the user moves one or more optical points around via the optical digital ruler, stylus, or other input device, a particular line associated with the vanishing point can be emphasized to illustrate activation of that line for use as a template. For instance, in FIG. 10, line 1006 is the presently selected line for use as a template based on the end points 1008 and 1010. With line 1006 selected for use as a template, a user may input a stroke path near the line 1006 to generate a drawing stroke 1014 that aligns with the line template 1006. The user may switch to another vanishing point by selecting a toggle button 1012, for example.

Figure 11:
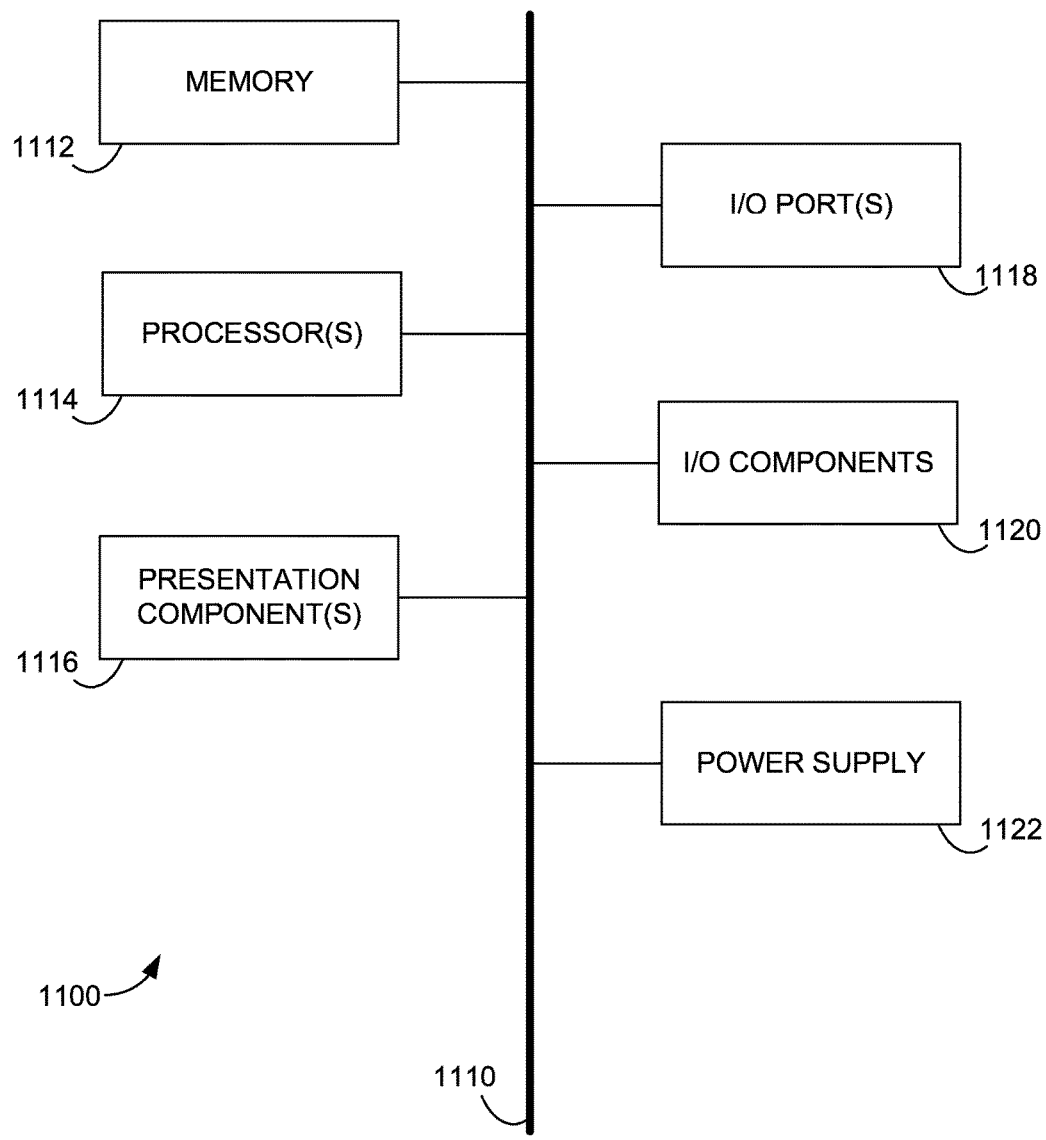
FIG. 11 is a block diagram of an exemplary computing device in which embodiments of the invention may be employed.

Having briefly described an overview of embodiments of the present invention, an exemplary operating environment in which embodiments of the present invention may be implemented is described below in order to provide a general context for various aspects of the present invention. Referring initially to FIG. 11 in particular, an exemplary operating environment for implementing embodiments of the present invention is shown and designated generally as computing device 1100. Computing device 1100 is but one example of a suitable computing environment and is not intended to suggest any limitation as to the scope of use or functionality of the invention. Neither should the computing device 1100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 11, computing device 1100 includes a bus 1110 that directly or indirectly couples the following devices: memory 1112, one or more processors 1114, one or more presentation components 1116, input/output (I/O) ports 1118, input/output components 1120, and an illustrative power supply 1122. Bus 1110 represents what may be one or more busses (such as an address bus, data bus, or combination thereof). Although the various blocks of FIG. 11 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 11 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 11 and reference to "computing device."

Computing device 1100 typically includes a variety of computer-readable media. Computer-readable media can be any available media that can be accessed by computing device 1100 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1112 includes computer-storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors that read data from various entities such as memory 1112 or I/O components 1120. Presentation component(s) 1116 present data indications to a user or other device. Exemplary presentation components include a display device, speaker, printing component, vibrating component, etc.

I/O ports 1118 allow computing device 1100 to be logically coupled to other devices including I/O components 1120, some of which may be built in. Illustrative components include a microphone, joystick, game pad, satellite dish, scanner, printer, wireless device, etc. The I/O components 1120 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail above) associated with a display of the computing device 1100. The computing device 1100 may be equipped with depth cameras, such as stereoscopic camera systems, infrared camera systems, RGB camera systems, touchscreen technology, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

As can be understood, embodiments of the present invention provide for, among other things, facilitating utilization of an optical digital ruler. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
    translating movement of an optical digital ruler associated with a device into coordinates of a canvas to which an electronic template should be moved, the optical digital ruler comprising at least two optical sensors;
    positioning the electronic template on the canvas in accordance with the coordinates;
    detecting a path, based on an interaction with the optical digital ruler, a stylus, or other input device, that corresponds to the electronic template; and
    in accordance with a detected path, drawing a stroke on the canvas that aligns with an edge of the electronic template.

2. The one or more computer storage media of claim 1, wherein the canvas is provided via a display, wherein the display is a non-touchscreen enabled display.

3. The one or more computer storage media of claim 1, further comprising providing, upon the optical digital ruler being communicatively coupled to the device, a default template on the canvas.

4. The one or more computer storage media of claim 1, further comprising providing a plurality of electronic templates from which the selection of the electronic template is made.

5. The one or more computer storage media of claim 1, further comprising translating rotation of the optical sensors relative to each other into rotation of the electronic template on the canvas.

6. The one or more computer storage media of claim 1, further comprising rotating the electronic template in accordance with rotation of the optical digital ruler.

7. The one or more computer storage media of claim 1 further comprising resizing the electronic template based on an interaction with the optical digital ruler, the stylus, or other input device associated with the device.

8. The one or more computer storage media of claim 1, further comprising repositioning the electronic template based on an interaction with the optical digital ruler, the stylus, or other input device associated with the device.

9. The one or more computer storage media of claim 1, further comprising detecting an additional path, based on an interaction with the stylus, that is in proximity to the detected path.

10. The one or more computer storage media of claim 9, further comprising in accordance with the additional path, drawing an additional stroke on the canvas that aligns with and is in proximity to the stroke.

11. A computer-implemented method comprising:
translating movement of at least two optical digital sensors associated with an optical digital ruler into coordinates on a canvas to which an electronic template used to draw precise strokes should be moved, the movement based on a user interaction with the optical digital ruler and including rotation of the optical digital ruler;
positioning the electronic template on the canvas in accordance with the coordinates, the canvas provided via a display associated with a computing device;
detecting a stroke path initiated at a location within proximity of the template, based on an interaction with the optical digital ruler, a stylus, or other input associated with the device; and
in accordance with the stroke path, drawing a stroke on the canvas that aligns with an edge of the electronic template.

12. The method of claim 11, wherein the stroke path is initiated via the optical digital ruler, a stylus, or other input associated with the computing device.

13. The method of claim 11, wherein the stroke path is recognized by a drawing application via the optical digital ruler, a stylus, or other input associated with the computing device.

14. The method of claim 11, wherein the display is a non-touchscreen enabled display.

15. The method of claim 11, further comprising:
determining that a second stroke path is initiated when the template is not to be used to draw precise strokes; and
drawing a second line that aligns with the second stroke path.

16. The method of claim 11 further comprising:
determining that a second stroke path is initiated at a second location within proximity of the template used to draw precise strokes;
identifying a second edge of the template that is nearest the location at which the second stroke path is initiated; and
automatically drawing a second line that abuts the second edge of the template as the second stroke path is detected irrespective of whether the stroke path coincides with the edge of the template.

17. An optical digital ruler comprising an elongated body having at least two optical sensors on a desktop surface of the body, wherein movement of the optical digital ruler is utilized to translate a position of the at least two optical sensors into coordinates on a canvas provided via a display, the movement based on a user interaction with the optical digital ruler and including rotation of the optical digital ruler.

18. The optical digital ruler of claim 17, wherein each of the at least two optical sensors comprises a light emitting diode (LED) and a complementary metal oxide semiconductor (CMOS) and comprises or shares a digital signal processor (DSP), wherein each LED is configured to produce a light emitted onto a surface that, upon reflecting off the surface is received by the respective CMOS as an image, the image being provided to the DSP to determine movement and speed of the optical digital ruler.

19. The optical digital ruler of claim 17, further comprising one or more mechanical buttons connected to a top surface opposing the desktop surface of the optical digital ruler.

20. The optical digital ruler of claim 17, further comprising a mechanical wheel connected to a top surface opposing the desktop surface of the optical digital ruler.

* * * * *